(12) United States Patent
Osborne et al.

(10) Patent No.: US 8,694,375 B2
(45) Date of Patent: Apr. 8, 2014

(54) DETERMINING WHETHER TO DISPLAY MESSAGE TO USER IN APPLICATION BASED ON USER MESSAGE VIEWING HISTORY

(75) Inventors: Thomas Ernest Osborne, Philadelphia, PA (US); Eric Lee Chin-Sang, Seattle, WA (US); Paul Leonard Kompfner, Seattle, WA (US); Chad Steven Estes, Woodinville, WA (US); Rahul Sudhir Kumar, Kirkland, WA (US); Michael Joseph Papale, Seattle, WA (US); Urja Madhukar Shah, Bellevue, WA (US); Ionut Ciprian Gradinaru, Sammamish, WA (US); Brian Ka-Hing Fung, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 142 days.

(21) Appl. No.: 13/249,765

(22) Filed: Sep. 30, 2011

(65) Prior Publication Data
US 2013/0086178 A1   Apr. 4, 2013

(51) Int. Cl.
*G06Q 30/00* (2012.01)

(52) U.S. Cl.
USPC ...................................................... 705/14.53

(58) Field of Classification Search
CPC .............................................. H04N 2201/3228
USPC ...................... 705/14.1, 14.13, 14.25, 14.41, 705/14.49–14.67; 715/708–713
See application file for complete search history.

(56) References Cited

U.S. PATENT DOCUMENTS

| | | | |
|---|---|---|---|
| 7,669,205 B2 | 2/2010 | Ghanaie-Sichanie et al. | |
| 7,809,342 B2 | 10/2010 | Wang | |
| 2003/0020744 A1* | 1/2003 | Ellis et al. | 345/723 |
| 2004/0003396 A1* | 1/2004 | Babu | 725/34 |
| 2004/0217163 A1 | 11/2004 | Savage | |
| 2006/0161550 A1 | 7/2006 | Carini et al. | |
| 2008/0195468 A1* | 8/2008 | Malik | 705/14 |
| 2009/0158318 A1* | 6/2009 | Levy | 725/32 |
| 2010/0030645 A1* | 2/2010 | Watanuki et al. | 705/14.53 |
| 2010/0057639 A1* | 3/2010 | Schwarz et al. | 705/400 |
| 2010/0179875 A1* | 7/2010 | Naito et al. | 705/14.54 |

OTHER PUBLICATIONS

Chanda, Sandeep., "Extending Microsoft Dynamics CRM 4.0 with Plug-Ins", Retrieved at <<http://www.devx.com/dotnet/Article/42660>>, Sep. 4, 2009, pp. 5.

"Using Microsoft Dynamics CRM 3.0 without Microsoft Exchange Server", Retrieved at <<http://www.microsoft.com/download/en/confirmation.aspx?id=4759>>, Mar. 1, 2006, pp. 10.

* cited by examiner

*Primary Examiner* — Lance L Barry
(74) *Attorney, Agent, or Firm* — Bryan Webster; Andrew Sanders; Micky Minhas

(57) ABSTRACT

One or more techniques and/or systems are disclosed for identifying an in-application message to display to a user. A user may perform a user action in an application, which can be identified. The identified user action can be compared to metadata data associated with a plurality of in-application messages for the application, and an in-application message that is eligible for display to the user can be identified based on the user action. A determination can be made whether to display the eligible message to the user in the application, based upon one or more in-application messages that the user may have previously viewed, as may be found or tracked in a user message viewing history.

20 Claims, 6 Drawing Sheets

DETERMINING WHETHER TO DISPLAY MESSAGE TO USER IN APPLICATION BASED ON USER MESSAGE VIEWING HISTORY

BACKGROUND

In a computing environment, applications and/or online services can comprise elements that may be unfamiliar or underutilized by a user. In order to provide appropriate customer relationship management (CRM) and/or to promote use of a particular feature, an application or service provider may include in-application messages, such as help features. Further, as an example, an application provider may wish to promote a particular product, up-sell a product, and/or cross-sell products. In this example, the application provider may also utilize in-application messaging to provide the user with appropriate information at desired times. In-application messages can often be provided as in-line text (in-line with text on an application page), as a text or UI element box, as a bubble, and/or as a floating pop-up frame, for example.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

An ability to display in-product, in-context messages to users may be valuable for a software application developer. For example, in-application messaging can provide an enhanced user experience by encouraging discovery and/or use of new or underutilized features, and/or providing tutorials or step-by-step instructions. Further, in-application messaging can provide additional benefits to the application developer, for example, by providing opportunities for up-selling or cross-selling products. While new releases of an application containing code changes and describing new in-application messages can be shipped and/or provided to a user to facilitate fresh application messaging, this approach is typically costly and may require a fast release cycle in order to introduce, update, and/or retire messages quickly and/or regularly.

Accordingly, one or more techniques and/or systems are disclosed for providing in-application messaging for an application, where in-application messages may be updated, for example, without needing to update an application. In this way, for example, an application developer has greater flexibility in creating and providing desirable in-application message campaigns that may be targeted to a user for a particular purpose. Additionally, for example, by providing the in-application messaging independently from the application, application code changes may not be necessary.

In one embodiment of identifying an in-application message to display to a user, a user action in an application, such as opening and/or interacting with an element of the application, can be identified. Further, in this embodiment, an eligible message (e.g., eligible for display to the user) that is associated with the user action can be identified. Additionally, in this embodiment, a determination can be made whether to display the eligible message to the user in the application, where the determination can be based at least upon a user message viewing history, such as what messages the user has previously viewed for the application.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
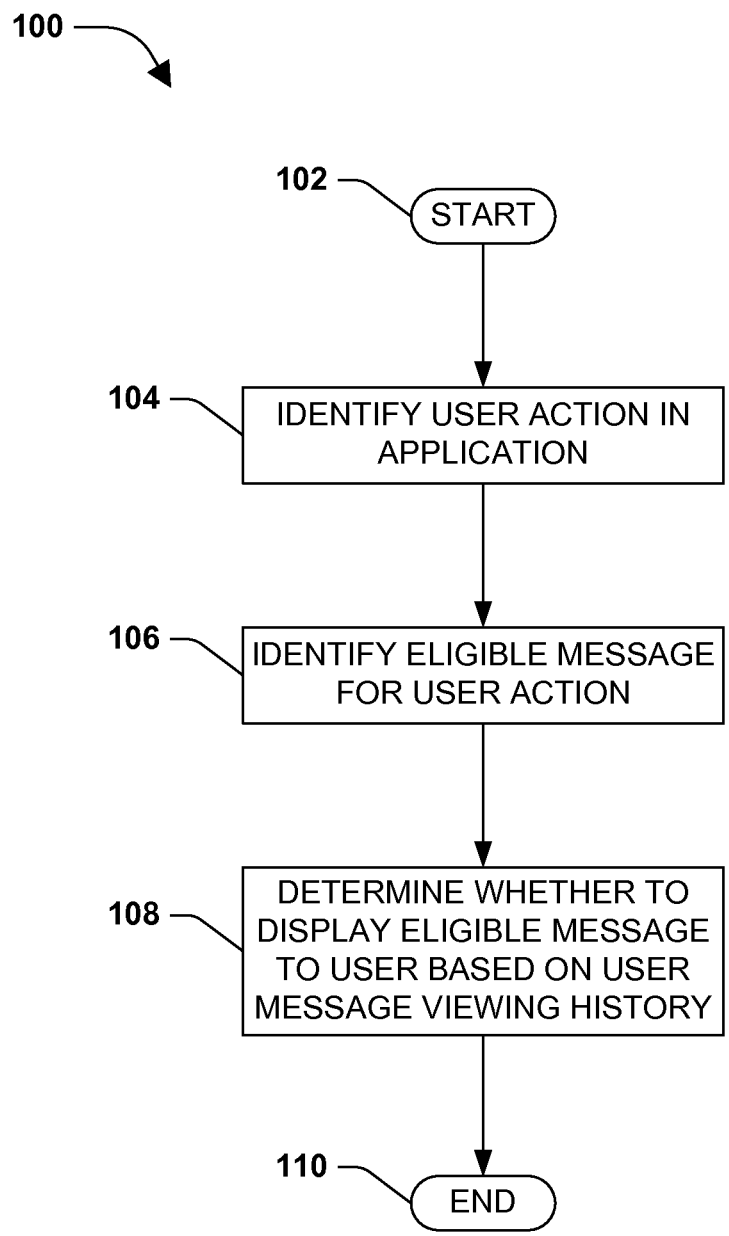
FIG. 1 is a flow diagram illustrating an exemplary method for identifying an in-application message to display to a user.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

As provided herein, a method may be devised that provides for scheduling and/or displaying in-application messages, such as Customer Relationship Management (CRM) messaging, to a user of an application. Often, in-application messages are displayed in context with the application in order to encourage the user to try new and/or underutilized features, to provide tutorials, for up-selling or cross-selling products, etc. As provided herein, these in-application messages can be updated independently of the application, as needed, for example, instead of having to ship a new version of the application comprising the updated messages. Further, how and when the messages are displayed to the user can be monitored and scheduled, for example, in order to provide an improved user experience.

FIG. 1 is a flow diagram illustrating an exemplary method 100 for identifying an in-application message to display to a user. The exemplary method 100 begins at 102. At 104, a user action can be identified in an application. As an example, a user action may comprise initiating at least a portion of the application (e.g., opening the application, or a portion thereof), interacting with one or more portions of the application (e.g., selecting a UI element on a page), requesting an action for the application (e.g., navigating to a page for an online application), viewing at least a portion of the application (e.g., opening and/or navigating to a particular page or view of the application), and/or requesting data comprised by the application (e.g., retrieving a file). It will be appreciated that the user action is not merely limited to the examples described herein, for example, the user action can comprise any user-related action that may cause the application to perform a response action, and may even comprise merely waiting for a period of time without performing a particular action (e.g., inaction).

At 106, an eligible message associated with the user action can be identified. An eligible message may comprise a message that is appropriate for displaying to the user based on the user action. As an example, the user action may comprise activating a portion of the application that comprises one or more features, for which a message (e.g., a CRM message) may be available. In this example, the one or more available messages for the activated portion may respectively comprise an eligible message (e.g., eligible for display to the user). As an illustrative example, a feature in the activated portion of the application may be underutilized (e.g., not used previously) by the user. In this example, the eligible message may encourage the user to try the feature (with which the message is associated), and/or give a short description of the feature.

In one embodiment, the eligible message(s) may be identified from a database comprising a plurality of in-application messages, where respective in-application messages are associated with one or more user actions. As an example, an in-application message may be linked to one or more user actions for the application, in the database (e.g., the in-application message may be used for more than one user action. In this example, when a user action is identified, the linked in-application message can be identified as an eligible message.

At 108 in the exemplary method 100, a user message viewing history may be used to determine whether to display the eligible message to the user in the application. As an example, in order to provide a desirable user experience, an application provider may not wish to overwhelm the user with in-application messages, and/or to repeatedly display a same in-application message in a manner that may be undesirable to the user.

The user message viewing history may be able to indicate which in-application messages have been previously displayed to the user, how often they have been displayed, and/or a last time respective in-application message were displayed, for example. Further, as an example, the user message viewing history may be able to indicate a subsequent user action for a displayed in-application message. This information from the user message viewing history may be used to determine whether one or more of the eligible in-application messages should be displayed to the user, for example, based on some pre-determined threshold (e.g., determined by the application provider, determined by a default threshold, determined by the user of the application, and/or determined by subsequent user actions for previously displayed in-application messages).

Having determined whether to display the eligible message to the user, the exemplary method 100 ends at 110.

Figure 2:
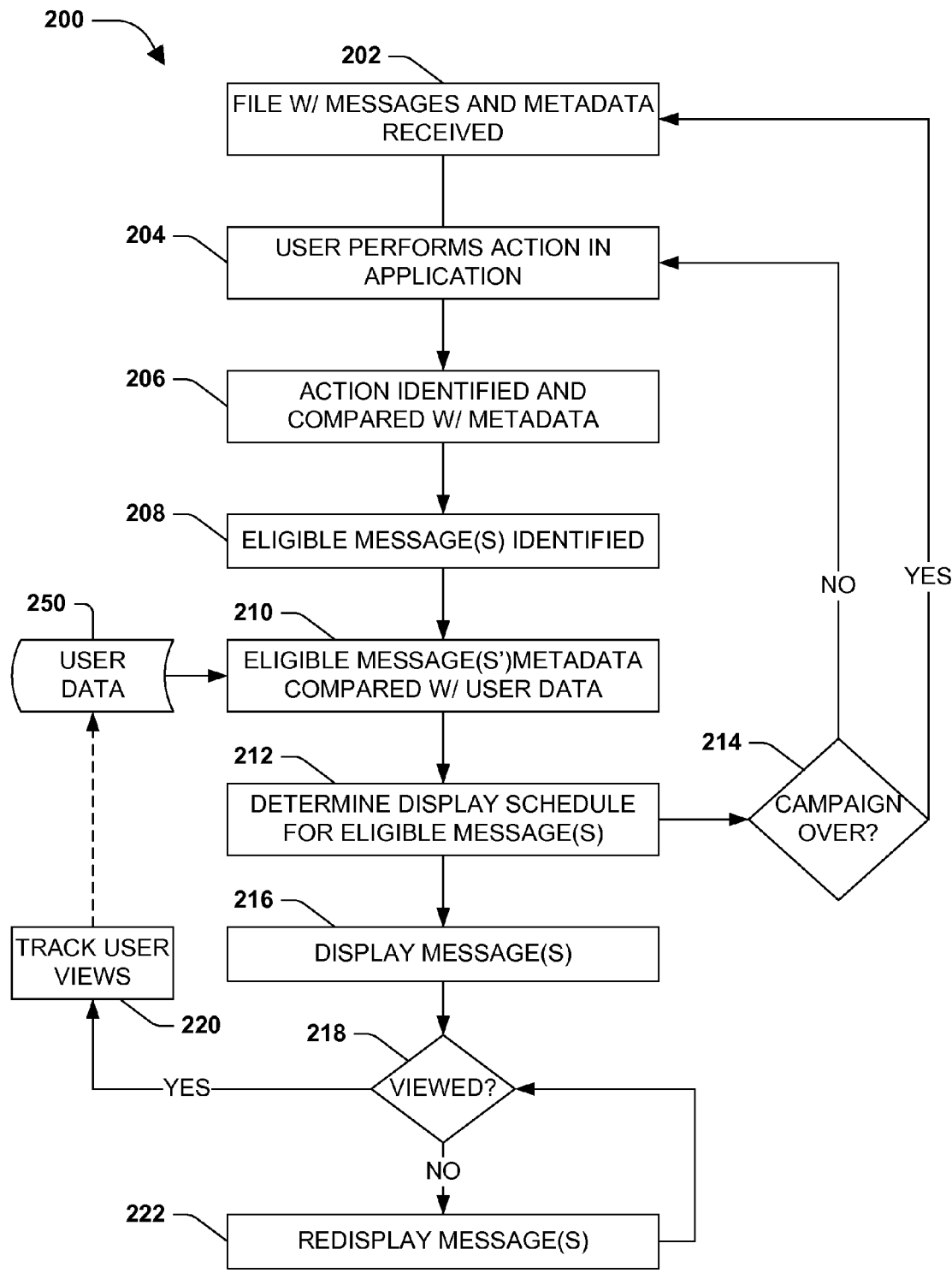
FIG. 2 is a flow diagram illustrating an example embodiment where one or more portions of one or more techniques described herein may be implemented.

FIG. 2 is a flow diagram illustrating an example embodiment 200 where one or more portions of one or more techniques described herein may be implemented. At 202, a file comprising in-application messages and associated metadata may be received. In one embodiment, the in-application messages, and relevant metadata, can be made available using a configuration file, for example, which can be deployed and subsequently updated without changes to business logic of an application, for example.

As an example, an application provider (e.g., application developer, distributor, partner, etc.) can provide the configuration file for use with the application, and/or may provide an updated version of the configuration file comprising one or more updated in-application messages, and associated metadata. In one embodiment, an application developer may provide the application to a user at a first time, and may provide the configuration file, comprising the in-application messages and associated metadata, at a second time. Further, for example, the application developer may provide an updated version of the configuration file at a third time.

In one embodiment, respective in-application messages in the configuration file may comprise associated metadata. The metadata can comprise an indication of an associated user action, such as a user action in the application that may identify the associated in-application message as an eligible message (e.g., when the user action occurs, the associated in-application message may be eligible for display to the user). In one embodiment, the metadata may comprise indications of how and/or when the in-application message may be eligible for display to the user (e.g., how and/or when the in-application message can be displayed to the user).

In this embodiment, the metadata may comprise a message display time period. For example, an in-application message associated with message display time period metadata may be intended to be merely displayed during a desired time period indicated by the metadata. As an illustrative example, the message display time period metadata may comprise a start time (e.g., comprising a date and/or clock time) and/or an end time, where the associated in-application message may be eligible for display to the user between the start and end times.

Further, for example, an eligible message can be associated with metadata that provides information identifying how the message may be structured when displayed to the user. In one embodiment, the metadata may comprise a message content reference, a message content sequence, and/or a message display mode. As an example, the message content reference may identify one or more portions of the associated in-application message, and the message content sequence may identify an arrangement sequence for the one or more portions, when displayed to the user. Additionally, for example, the message display mode can identify a way in which the associated in-application message may be displayed, such as in-line text, a text frame, a text bubble, a pop-up, etc.

An eligible message can be also be associated with metadata that provides information identifying how the message may be displayed to the user. In one embodiment, the metadata may comprise one or more message display characteristics for the associated message. As an example, the one or more message display characteristics may comprise a location for the in-application message (e.g., tied to a particular element in a user interface (UI) for the application). As another example, the one or more message display characteristics may comprise text characteristics, such as font, color, spacing, size, etc., and/or may comprise characteristics of other message elements, such as images, video, media elements, etc.

An eligible message can be also be associated with metadata that provides information identifying when to choose one eligible message over another eligible message. In one embodiment, the metadata may comprise a message priority, a message type, and/or a message campaign identifier. As an example, a message priority can provide an indication of order of preference for display to the user, where a message having a higher priority may be prioritized for display over a message having a lower priority. As an illustrative example, where a first and second in-application message are both eligible for display, the first message with a priority of one may be displayed first over the second message having a lesser priority of two (e.g., or some other indication of priority).

Further, as an example, a message type may identify a classification for the message, which may be used to select merely eligible messages for display that comprise a particular classification. As an illustrative example, a third and fourth message may both be eligible for display to the user. In this example, the third message may comprise a "tutorial" type of message, and the fourth message may comprise an "up-selling" type of message. Depending on indicated preference for the type of message, the third message may be displayed first and the fourth message may be displayed second (e.g., or vice versa).

Additionally, as an example, a message campaign identifier may used to associate one or more in-application messages with a particular message campaign. As an example, an application provider desiring to increase use of a particular feature in the application can develop a campaign designed to facilitate the desired use increase. In this example, the campaign can comprise in-application messages that prompt the user to utilize the feature, provide tutorials for using the feature, and/or inform the user of benefits of using the feature. In this example, a campaign identifier may be used to identify the in-application message associated with the developer campaign, which may provide an indication of which eligible messages to display (e.g., choosing messages in a first campaign over messages in a second campaign for display).

At 204 in the example embodiment 200, the user can perform a user action in the application. As an example, the user action can comprise opening the application (e.g., or a portion thereof), an interaction with one or more elements of the application (e.g., selecting a UI element), entering data, navigating through portions of the application (e.g., opening a page in the application), viewing a portion of the application, or merely performing no explicit actions for a period of time. At 206, the user action may be identified and compared with metadata associated with one or more in-application messages for the application (e.g., in the configuration file comprising the in-application messages and associated metadata).

For example, comparing the identified user action with metadata associated with one or more in-application messages may result in a match (e.g., the identified user action matches a user action indicated in the metadata, as described above at 202). In one embodiment, one or more in-application messages may be associated with the matched metadata, such as in the configuration file, and the one or more in-application messages may comprise a set of potentially eligible messages. That is, for example, an in-application message that comprises metadata indicating a user action that matches the action performed by the user may be eligible for display to the user, depending on subsequent review.

At 208, in the example embodiment 200, one or more eligible messages can be identified. For example, the set of potentially eligible messages (e.g., comprising metadata matching the user action) may be reviewed to identify one or more eligible messages. In one embodiment, identifying an eligible message can comprise identifying an eligible campaign that may be associated with the message, where the eligible campaign can be identified by the metadata associated with the eligible message. As an example, the metadata associated with the eligible message may comprise a campaign identifier that can be compared against a list of one or more eligible campaigns (e.g., determined by the application developer, user, and/or programmatically).

In one embodiment, identifying an eligible message can comprise identifying an eligible display time period associated with the message, where the eligible display time period can be identified by the metadata associated with the eligible message. As an example, a current time (e.g., and/or desired future display time) can be compared against a time period indicated by the metadata associated with the eligible message. In this example, if the current time falls within the time period indicated by the metadata, the time period indicated by the metadata can comprise the eligible display time, and the associated in-application message can comprise an eligible message.

In one embodiment, identifying an eligible message can comprise identifying eligible message content, where the eligible message content may be identified by the metadata associated with the eligible message. As an example, message content may be indicated by a message content reference comprised by the metadata associated with an in-application message. For example, the message content reference in the metadata may be compared with a set of one or more desired message contents (e.g., determined by the application developer, user, and/or programmatically). In this example, if the message content reference in the metadata matches a desired message content the in-application messages associated with metadata comprising the matched message content reference can comprise an eligible message.

At 210 in the example embodiment 200, if one or more eligible messages are identified, one or more portions of metadata associated with an identified eligible message can be compared with user data 250, for example, to determine whether the identified eligible message may be displayed to the user. User data 250 can comprise a user message viewing history, for example, that identifies a history of in-application messages viewed by the user, for the application. Further, in one embodiment, the user message viewing history can be generated by tracking a type of in-application message viewed, a time of viewing, a campaign associated with the message, a user response to a displaying of the in-application message, and more.

In this embodiment, for example, an eligible message type, campaign identifier, and/or content reference comprised in the metadata can be compared to the user data 250, to determine whether the user may have previously viewed a similar (e.g., or same) message. In this example, a time of a previous message display can be identified from the user data 250 to determine when a similar (e.g., or same) type of message was displayed to the user. In one embodiment, the time of a previous message display can be compared to a desired time period threshold, which can be used to identify whether the eligible message should be displayed to the user (e.g., don't display a message if a similar one was shown within the last twenty-four hours, within the last three times the page was viewed, within the last four times the UI elements was interacted with, etc.).

Further, a response to the previously displayed message may be identified from the user data 250, for example, to determine whether a similar (e.g., or same) type of message should be displayed to the user. As an example, a last time the similar message was displayed to the user, the user may have selected an action that involved the message (e.g., acted upon advice in the message). In this example, based on the user's previous response to a similar message, the eligible message may not be displayed to the user (e.g., if previously viewed and/or acted upon).

At 212, a display schedule can be determined for the one or more eligible messages, for example, based on the comparison of the user data 250 to the metadata associated with the one or more eligible messages. For example, an eligible message that does not meet the desired time period threshold (e.g., a similar or same message was displayed within the threshold) may be scheduled for display to the user after the time period of the desired time period threshold has expired. That is, for example, if an in-application message was displayed to the user within the last twenty-four hours, a similar or same in-application message may be scheduled for display after the twenty-four hour time period has expired. As another example, if the eligible message comprises a type and/or content that has not been recently displayed to the user (e.g., exceeds the desired time period threshold), the eligible message may be scheduled for display immediately.

In one embodiment, an eligible message may be selected to display to the user based at least upon a priority that may be identified in the metadata associated with the message. For example, a first eligible message may comprise a first priority, and a second eligible message may comprise a second priority. In this example, if the first priority is higher than the second priority (e.g., for displaying purposes) the first eligible message can be scheduled for display before the second eligible message. As an illustrative example, the first eligible message may be displayed immediately, and the second eligible message may be scheduled for display at a later time (e.g., after the desired time period threshold expires).

At 216 in the example embodiment 200, one or more of the one or more eligible messages can be displayed to the user, for example, at the scheduled time. In one embodiment, how an eligible message is displayed to the user can be determined by metadata associated with the eligible message. For example, the associated metadata can comprise a message display mode, message display sequence, and/or one or more message display characteristics. The message display mode can identify a way the message is presented, such as in a text box, as in-line text, in an animated bubble, or some other UI element, for example. The message display sequence may identify a sequence of display for one or more portions of the message content; and one or more message display characteristics may identify what the contents of the message look like (e.g., font, color, animation), and/or where on a UI page the message may be displayed (e.g., tied to a particular UI element).

In one embodiment, at 214, it may be determined whether an in-application message campaign has ended. As described above (e.g., at 202), an application provider may develop an in-application message campaign for an application, such as to promote a feature and/or market a product. As an example, a campaign may end after a desired time period (e.g., identified in metadata associated with a campaign message), and/or may end after a desired number of message views (e.g., or interactions). If the campaign has not ended (NO at 214) the application may be monitored to identify if another user action occurs, at 204. If the campaign is over (YES at 214), another file may be received that comprises a plurality of in-application messages for a new campaign, as well as metadata associated with the in-application messages.

At 218, it may be determined whether a displayed eligible message has been viewed by the user. In one embodiment, determining whether the displayed eligible message has been viewed by the user can comprise identifying a period of time that the eligible message was displayed, for example, in a UI for the application. As an example, the eligible message may be displayed in the UI, and, after a period of time, the user may interact with the UI in such a way as to navigate away from the displayed eligible message (e.g., close the message, open another UI that closes the message, navigate away from a page displaying the message).

In this embodiment, if the identified period of time is less than a desired display time threshold, the message may be considered as not viewed by the user (e.g., the message is not displayed for the desired period of time). If the eligible message is not considered to be viewed by the user (NO at 218), the message can be scheduled for redisplay, and can be displayed to the user at 222. In one embodiment, the message may be redisplayed for a period of time that meets the desired display time threshold (e.g., redisplay for the entire desired time period). In one embodiment, the message may be redisplayed merely for an amount of time that, when combined with the amount of time the message was previously displayed, meets the desired display time threshold (e.g., make up the display time difference between the original display and the desired time period).

If the eligible message is determined to be viewed by the user (YES at 218), the user views of one or more in-application messages can be tracked, at 220, resulting in the user message viewing history. As an example, a time, type, and other related metadata, can be identified for the viewed in-application message. In this example, the tracked data can be put into the user message viewing history, and saved in the user data 250 (e.g., locally on a user machine and/or remotely).

A system may be devised that provides for displaying and/or scheduling the display of different in-application messages, for example, across various views in an application. Further, the configurations of the different in-application messages may be updated independently of the application, thereby mitigating a need for any code changes. Additionally, displayed in-application messages may be re-displayed, for example, where a user may not to have actually viewed the message, thereby increasing a probable effectiveness of the messaging.

Figure 3:
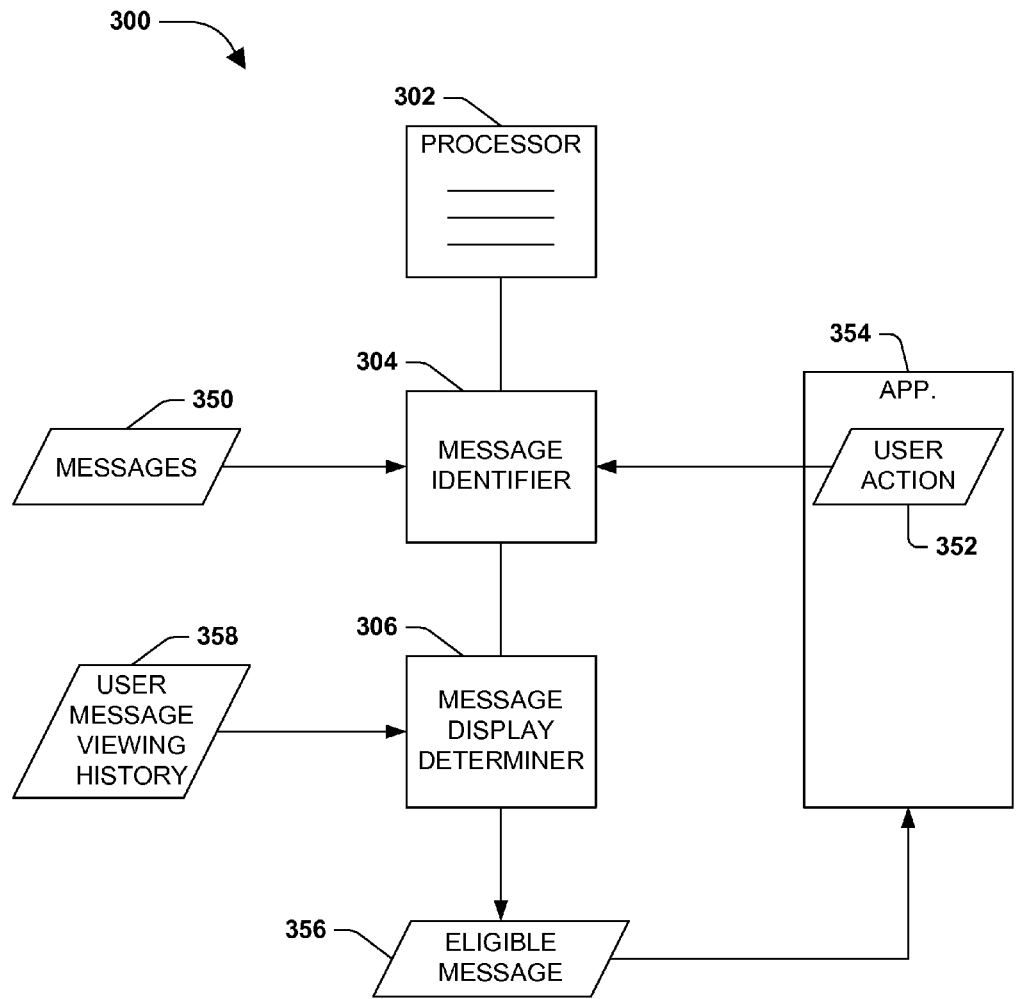
FIG. 3 is a component diagram illustrating an exemplary system for identifying an in-application message to display to a user.

FIG. 3 is a component diagram illustrating an exemplary system 300 for identifying an in-application message to display to a user. In the exemplary system 300, a computer-based processor 302 is configured to process data for the system; and processor 302 is operably coupled with a message identification component 304. The message identification component 304 is configured to identify an eligible message 356 from a plurality of in-application messages 350, based at least upon a user action 352 in an application 354 associated with the eligible message 356. As an example, the user action may be identified in metadata associated with the eligible message (e.g., the message is eligible for display if the user action matches information in the metadata for the message).

In the exemplary system 300, a message display determination component 306 is operably coupled with the message identification component 304. The message display determination component 306 is configured to determine whether to display the eligible message 356 to the user in the application 354 based at least upon a user message viewing history 358. As an example, a message may be eligible for display, but if the message display determination component 306 determines that a same or similar message was previously displayed to the user (e.g., within a desired time frame and/or action iteration number), the eligible message 356 may not be displayed to the user in the application (e.g., at least not until the desired time frame has expired).

Figure 4:
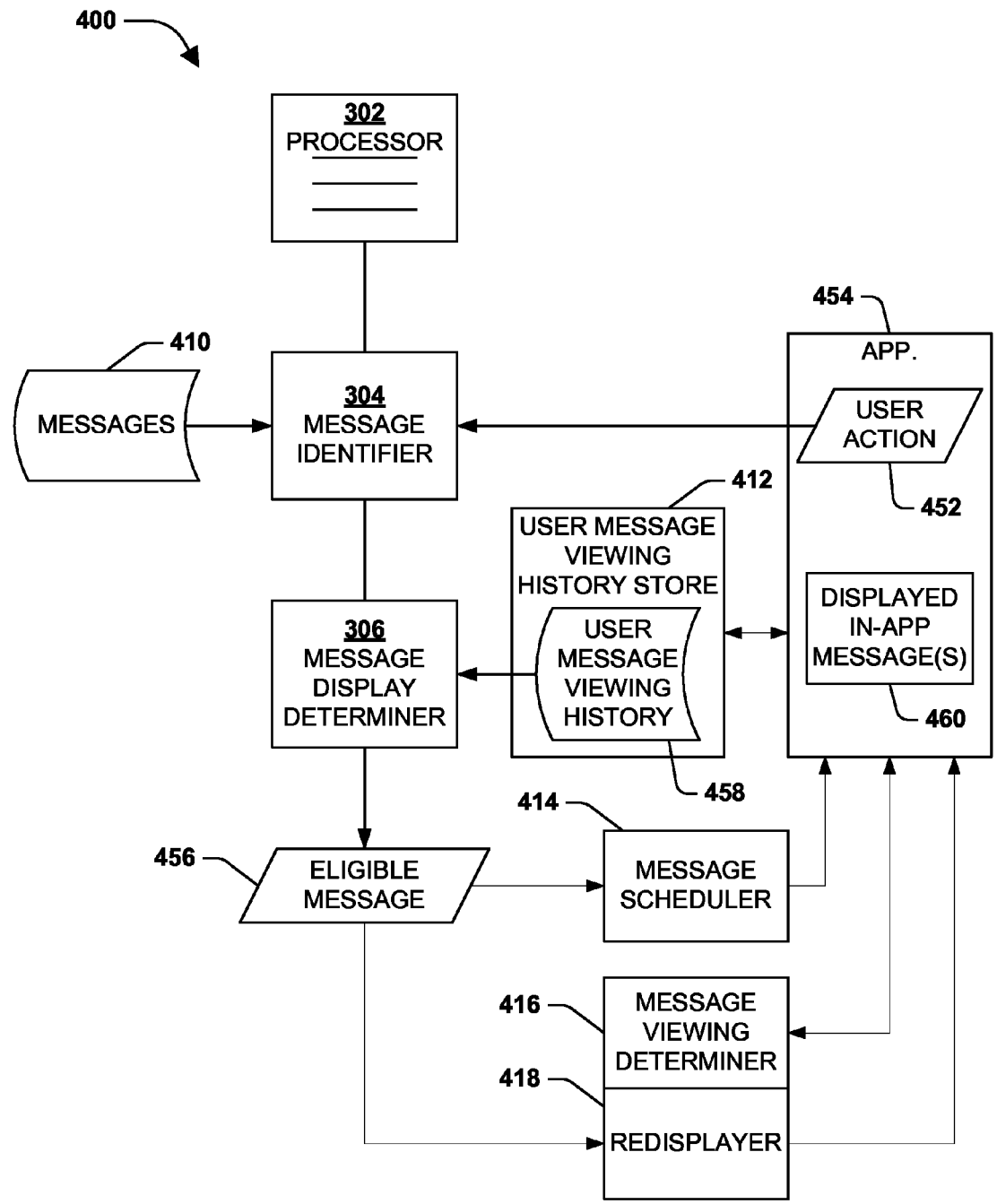
FIG. 4 is a component diagram illustrating an example embodiment where one or more systems described herein may be implemented.

FIG. 4 is a component diagram illustrating an example embodiment 400 where one or more systems described herein may be implemented. In this example 400, an extension of FIG. 3 is provided and thus description of elements, components, etc. described with respect to FIG. 3 may not be repeated for simplicity. In the example embodiment 400, a message database component 410 can comprise the plurality of in-application messages that are respectively associated with message metadata. In one embodiment, the message database component 410 can be configured to be updated with one or more new messages for an application 454. As an example, a first set of in-application messages, and associated message metadata, can be stored by the message database component 410 (e.g., for a first message campaign for the application). In one example, a second set of in-application messages, and associated message metadata, can be updated to the message database component 410, where the second set of in-application messages comprises updated in-application messages (e.g., for a second message campaign for the application).

The example embodiment 400 comprises a user message viewing history store component 412 that can be configured to track user views of one or more displayed in-application messages 460 resulting in a user message viewing history 458. Further, the user message viewing history store component 412 can be configured to store the user message viewing history 458 in storage on a local user machine (e.g., running the application 454) and/or in remote storage (e.g., remote server) connected to the local user machine. As one example, the user message viewing history 458 may be stored in a local cookie on the users machine; and/or the user message viewing history 458 may be stored in a remote database accessed by the application 454.

The example embodiment 400 comprises a message scheduling component 414 that can be configured to schedule a display of one or more eligible messages 456 determined to be displayed as in-application messages 460 (e.g., based at least in part upon user action 452). In one embodiment, the scheduling can be based upon the user message viewing history 458 and metadata that is associated with the one or more eligible messages. For example, the message display determination component 306 may identify an eligible message 456 (e.g., eligible for display to the user); and, the message scheduling component 414 may determine that the eligible message 456 should be scheduled for display at a later time (e.g., not immediately), due to the user recently viewing a same or similar message (e.g., determined by a message type indicated in the message metadata).

The example embodiment 400 comprises a message viewing determination component 416 that can be configured to determine whether the user viewed the displayed eligible message (e.g., in-application message 460), when the eligible message is displayed. In one embodiment, the message viewing determination component 416 can comprise a timing component that may be configured to identify a first amount of time the eligible message is displayed (e.g., measures how long the message is displayed before the user may navigate away form or close the message). In one embodiment, the message viewing determination component 416 can comprise a threshold determination component that may be configured to determine if the first amount time meets a desired display time threshold (e.g., was the message displayed for a desired amount of time before being close or navigated away from).

In the example embodiment 400, a redisplay component 418 can be configured to redisplay the eligible message 456 (e.g., as a displayed in-application message 460) if the first amount of time (e.g., of a first displaying of the message) does not meet the desired display time threshold (e.g., re-display the message if not displayed for the desired amount of time). In one embodiment, the redisplaying can comprise displaying the eligible message 456 for at least a second amount of time, where the second amount of time meets the desired display time threshold (e.g., redisplay the displayed message 460 for the desired amount of time). In one embodiment, redisplaying can comprise displaying the eligible message 456 for at least a third amount of time, where the third amount of time, when combined with the first amount of time, meets the desired display time threshold (e.g., redisplaying the display message 460 for an amount of time that makes up the display time missed when the user closed or navigated away from the message). It will be appreciated that, unless indicated to the contrary, terms such as "first," "second," and/or the like are merely used herein as identifiers, names, designations, etc. (e.g., to be able to distinguish different elements, items, periods, etc. from one another), and are not meant to imply an ordering, sequence, importance, temporal arrangement, etc.

Figure 5:
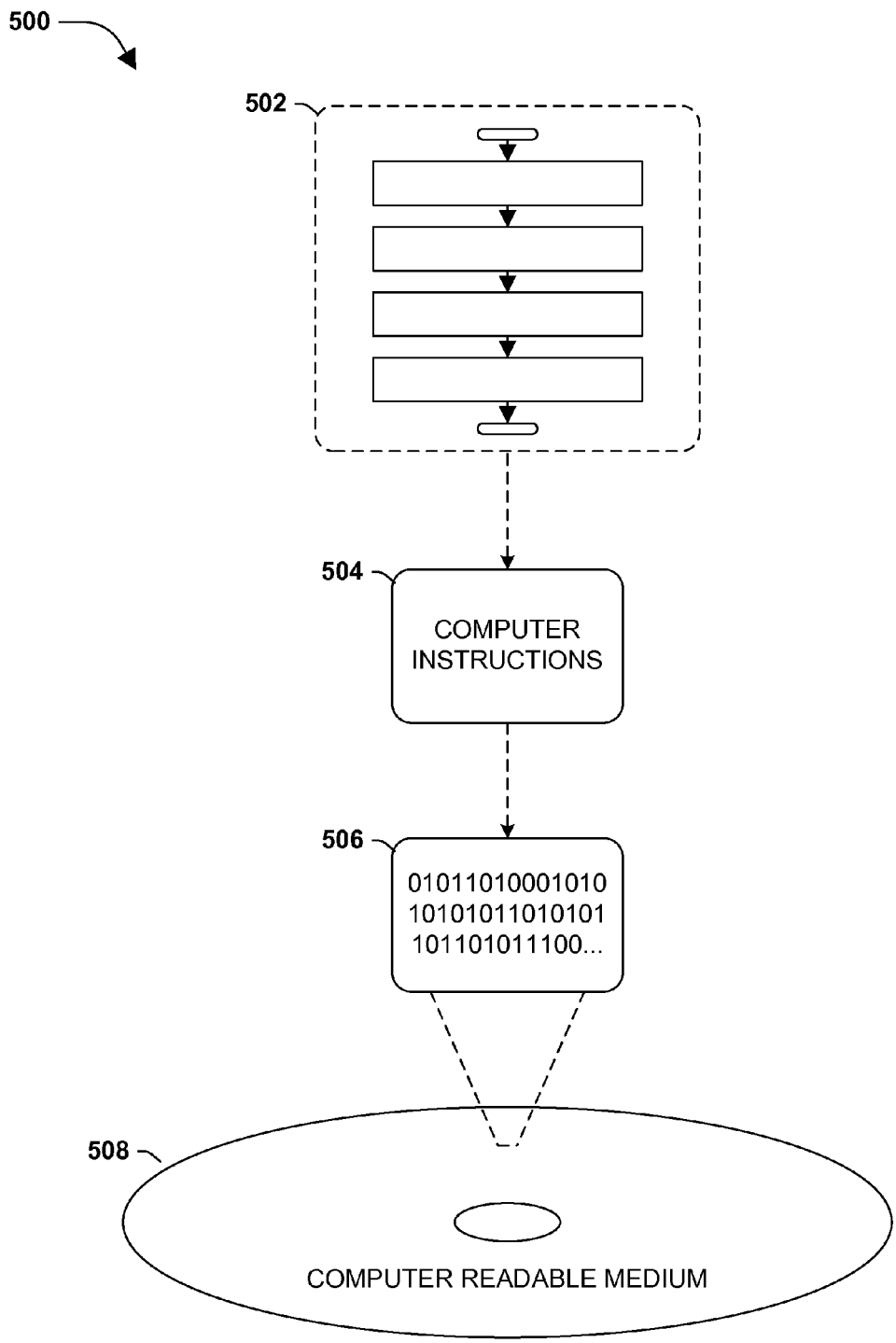
FIG. 5 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 5, wherein the implementation 500 comprises a computer-readable medium 508 (e.g., a CD-R, DVD-R, or a platter of a hard disk drive), on which is encoded computer-readable data 506. This computer-readable data 506 in turn comprises a set of computer instructions 504 configured to operate according to one or more of the principles set forth herein. In one such embodiment 502, the processor-executable instructions 504 may be configured to perform a method, such as at least some of the exemplary method 100 of FIG. 1, for example. In another such embodiment, the processor-executable instructions 504 may be configured to implement a system, such as at least some of the exemplary system 300 of FIG. 3, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system," "interface," and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 6:
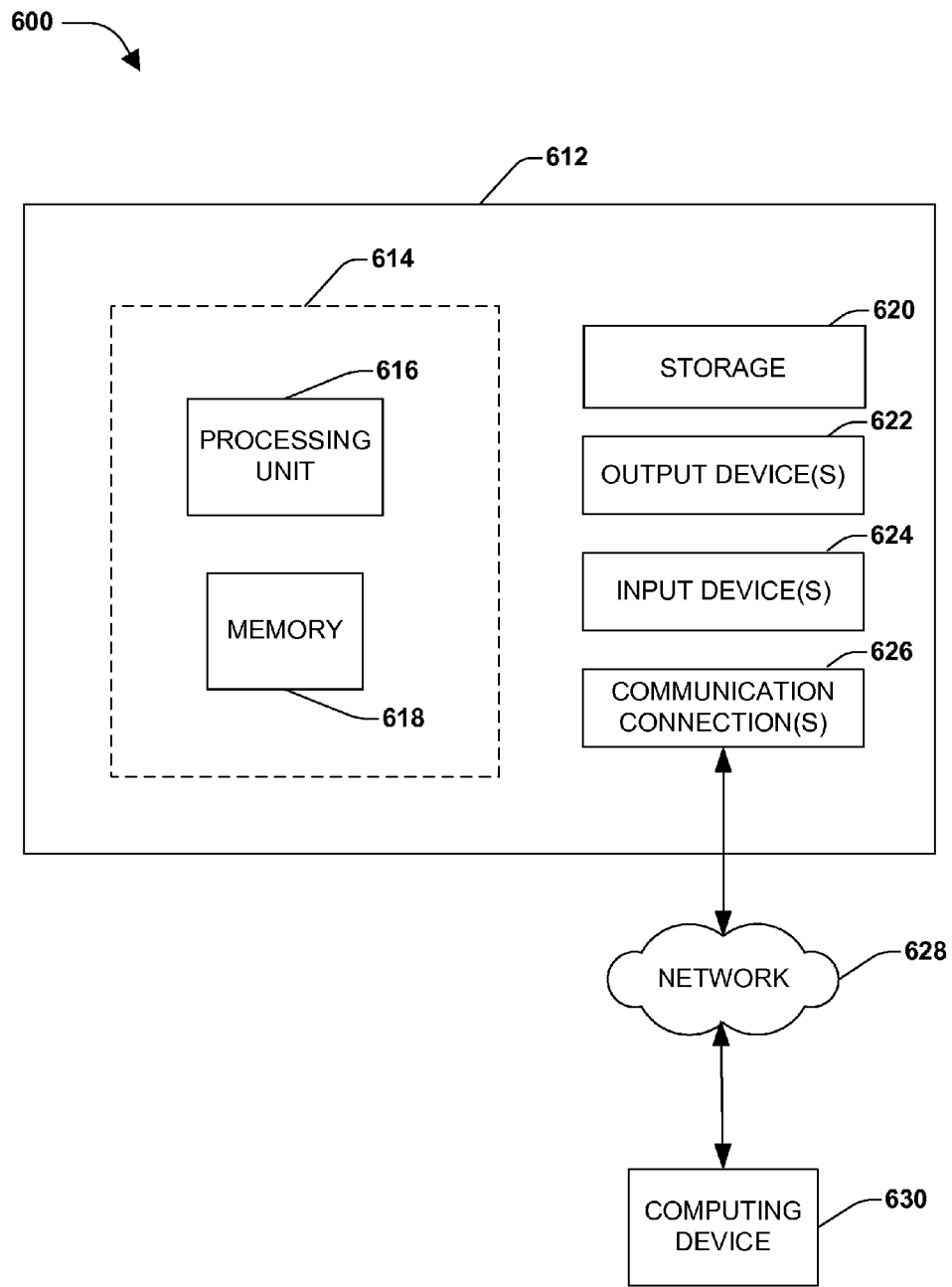
FIG. 6 illustrates an exemplary computing environment wherein one or more of the provisions set forth herein may be implemented.

FIG. 6 and the following discussion provide a brief, general description of a suitable computing environment to implement embodiments of one or more of the provisions set forth herein. The operating environment of FIG. 6 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 6 illustrates an example of a system 600 comprising a computing device 612 configured to implement one or more embodiments provided herein. In one configuration, computing device 612 includes at least one processing unit 616 and memory 618. Depending on the exact configuration and type of computing device, memory 618 may be volatile (such as RAM, for example), non-volatile (such as ROM, flash memory, etc., for example) or some combination of the two. This configuration is illustrated in FIG. 6 by dashed line 614.

In other embodiments, device 612 may include additional features and/or functionality. For example, device 612 may also include additional storage (e.g., removable and/or non-removable) including, but not limited to, magnetic storage, optical storage, and the like. Such additional storage is illustrated in FIG. 6 by storage 620. In one embodiment, computer readable instructions to implement one or more embodiments provided herein may be in storage 620. Storage 620 may also store other computer readable instructions to implement an operating system, an application program, and the like. Computer readable instructions may be loaded in memory 618 for execution by processing unit 616, for example.

The term "computer readable media" as used herein includes computer storage media. Computer storage media includes volatile and nonvolatile, removable and non-removable media implemented in any method or technology for storage of information such as computer readable instructions or other data. Memory 618 and storage 620 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 612. Any such computer storage media may be part of device 612.

Device 612 may also include communication connection(s) 626 that allows device 612 to communicate with other devices. Communication connection(s) 626 may include, but is not limited to, a modem, a Network Interface Card (NIC), an integrated network interface, a radio frequency transmitter/receiver, an infrared port, a USB connection, or other interfaces for connecting computing device 612 to other computing devices. Communication connection(s) 626 may include a wired connection or a wireless connection. Communication connection(s) 626 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 612 may include input device(s) 624 such as keyboard, mouse, pen, voice input device, touch input device, infrared cameras, video input devices, and/or any other input device. Output device(s) 622 such as one or more displays, speakers, printers, and/or any other output device may also be included in device 612. Input device(s) 624 and output device(s) 622 may be connected to device 612 via a wired connection, wireless connection, or any combination thereof. In one embodiment, an input device or an output device from another computing device may be used as input device(s) 624 or output device(s) 622 for computing device 612.

Components of computing device 612 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 612 may be interconnected by a network. For example, memory 618 may be comprised of multiple physical memory units located in different physical locations interconnected by a network.

Those skilled in the art will realize that storage devices utilized to store computer readable instructions may be distributed across a network. For example, a computing device 630 accessible via network 628 may store computer readable instructions to implement one or more embodiments provided herein. Computing device 612 may access computing device 630 and download a part or all of the computer readable instructions for execution. Alternatively, computing device 612 may download pieces of the computer readable instructions, as needed, or some instructions may be executed at computing device 612 and some at computing device 630.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, At least one of A and B and/or the like generally means A or B or both A and B. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A computer-based method for identifying a message to display to a user, comprising:
    identifying a first user action in an application;
    identifying a first message associated with the first user action from a database, the database associating the first message with the first user action and a second message with a second user action, the database not associating the first message with the second user action, the database not associating the second message with the first user action; and
    determining whether to display the first message to the user in the application based at least upon a user message viewing history.

2. The method of claim 1, identifying the first message comprising comparing the first user action to metadata associated with the first message.

3. The method of claim 2, identifying the first message comprising one or more of:
    identifying an eligible campaign with which the first message is associated, the eligible campaign identified by the metadata associated with the first message;
    identifying an eligible display time period associated with the first message, the eligible display time period identified by the metadata associated with the first message; or
    identifying first message content, the first message content identified by the metadata associated with the first message.

4. The method of claim 1, determining whether to display the first message to the user comprising comparing the user message viewing history with metadata associated with the first message.

5. The method of claim 4, comparing the user message viewing history with the metadata associated with the first message comprising one or more of:
    comparing a viewed message view time with a time period threshold identified in the metadata associated with the first message; or
    comparing a viewed message type with message type identified in the metadata associated with the first message.

6. The method of claim 1, comprising tracking user views of one or more messages resulting in the user message viewing history.

7. The method of claim 1, comprising selecting the first message to display to the user in the application from a plurality of eligible messages based at least upon a priority identified in metadata associated with the first message.

8. The method of claim 1, comprising receiving a file comprising a plurality of messages respectively associated with metadata, the plurality of messages comprising the first message.

9. The method of claim 8, the metadata comprising one or more of:
    an associated user action;
    a message display time period;
    a message content reference;
    a message content sequence;
    a message display mode;
    a message priority;
    a message type;
    a message campaign identifier; or
    one or more message display characteristics.

10. The method of claim 1, comprising displaying the first message and determining whether the user viewed the displayed first message.

11. The method of claim 10, determining whether the user viewed the displayed first message comprising one or more of:
    identifying a first amount of time the first message is displayed; or
    comparing the first amount time to a desired display time threshold.

12. The method of claim 11, comprising redisplaying the first message if the first amount of time does not meet the desired display time threshold, the redisplaying comprising one or more of:
    displaying the first message for at least a second amount of time, the second amount of time meeting the desired display time threshold; or
    displaying the first message for at least a third amount of time, the third amount of time, when combined with the first amount of time, meeting the desired display time threshold.

13. A computer readable device comprising computer executable instructions that when executed perform a method for identifying a message to display to a user, the method comprising:
    identifying a first user action in an application;
    identifying a first message associated with the first user action from a database, the database associating the first message with the first user action and a second message with a second user action; and
    determining whether to display the first message to the user in the application.

14. A system, comprising:
    one or more processing units; and
    memory comprising instructions that when executed by at least one of the one or more processing units perform operations to identify a message to display to a user comprising:
        identifying a first user action in an application;

identifying a first message associated with the first user action from a database, the database associating the first message with the first user action and a second message with a second user action, the database not associating the first message with the second user action, the database not associating the second message with the first user action; and determining whether to display the first message to the user in the application based at least upon a user message viewing history.

15. The system of claim 14, identifying the first message comprising comparing the first user action to metadata associated with the first message.

16. The system of claim 15, identifying the first message comprising one or more of:

identifying an eligible campaign with which the first message is associated, the eligible campaign identified by the metadata associated with the first message;

identifying an eligible display time period associated with the first message, the eligible display time period identified by the metadata associated with the first message; or identifying first message content, the first message content identified by the metadata associated with the first message.

17. The system of claim 14, determining whether to display the first message to the user comprising comparing the user message viewing history with metadata associated with the first message.

18. The system of claim 17, comparing the user message viewing history with the metadata associated with the first message comprising one or more of:

comparing a viewed message view time with a time period threshold identified in the metadata associated with the first message; or comparing a viewed message type with a message type identified in the metadata associated with the first message.

19. The system of claim 14, comprising tracking user views of one or more messages resulting in the user message viewing history.

20. The system of claim 14, comprising displaying the first message.

* * * * *